United States Patent [19]

Murphy et al.

[11] 3,731,414
[45] May 8, 1973

[54] ANIMAL EAR TAGS AND APPLICATORS THEREFOR

[76] Inventors: Brian Egmont Murphy, Mangawhere Road, Kaponga, Taranaki; John Reginald Burford, 604 Main Street, Palmerston North, both of New Zealand

[22] Filed: Apr. 29, 1971

[21] Appl. No.: 138,575

[30] Foreign Application Priority Data

Feb. 5, 1971  New Zealand..........................162709

[52] U.S. Cl....................................................40/301
[51] Int. Cl....................................................G09f 3/12
[58] Field of Search..................24/40 E, 90 R, 150 C, 24/150 FC, 150 R; 40/300–304, 2 F; 85/DIG. 2, 30; 402/1; 83/686, 684

[56] References Cited

UNITED STATES PATENTS

| | | | |
|---|---|---|---|
| 3,214,856 | 11/1965 | Brierley | 40/301 |
| 3,184,874 | 5/1965 | Schofield | 40/301 |
| 2,940,199 | 6/1960 | Goldberg | 40/301 |

FOREIGN PATENTS OR APPLICATIONS 623,518  7/1961  Canada..................................83/684

*Primary Examiner*—Wm. H. Grieb
*Attorney*—Richard P. Alberi

[57] ABSTRACT

An animal ear tag comprising two components formed of a plastics or other resilient material, a first component having a hollow stem with a flanged end which has a spike of hard plastic or other rigid material shaped from its back end with a hole for the reception of a guide pin of a reusable back plate, and the second component having a boss with a hole for fitting over such end whereby with each component detachably mounted on a jaw of a pliers-like applicator and the pin of the backplate inserted through the hollow stem of the first component and into the hole of the rigid spike, on a closing of the jaws of the applicator, the spike and stem of the first component is forced through the ear of an animal, and through the hole in the second component, and on an opening of the jaws of the applicator, the rigid pin and its backplate is left within the hollow stem of the first component, and the second component retained on the hollow stem and the spike on the end of the first component, the reusable backing plate with the pin being now withdrawn from the applied tag.

9 Claims, 3 Drawing Figures

PATENTED MAY 8 1973 3,731,414
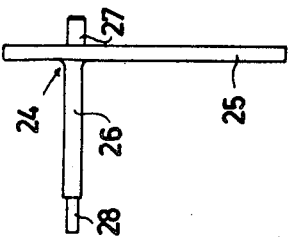
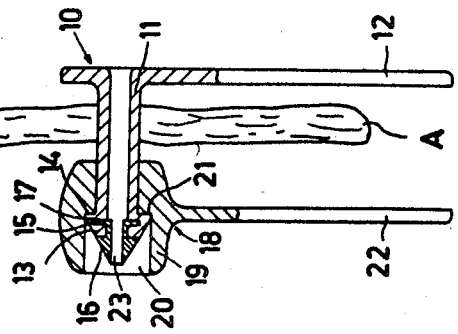
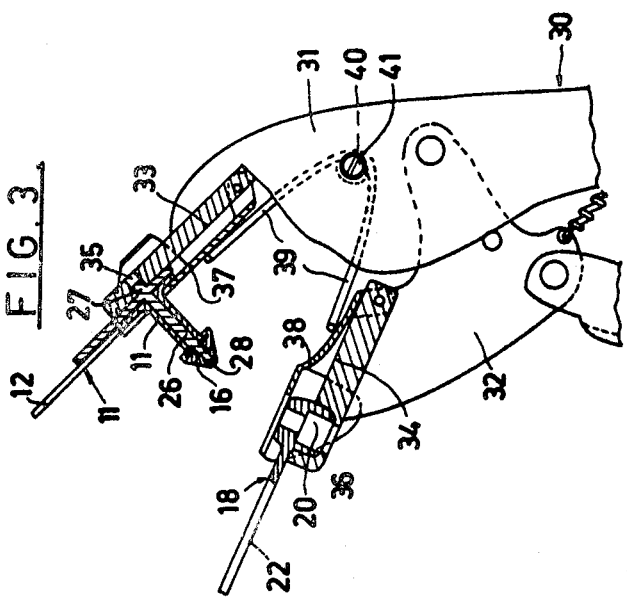

ANIMAL EAR TAGS AND APPLICATORS THEREFOR

This invention relates to improvements in tags designed for attachment to ears of animals for identification, and to applicators for installing the tags.

It is well known to provide such a device comprising two parts or components, a male part having a pointed pin which is adapted to be forced through an ear of the animal and a female part having a hole and forced over the pointed end of the pin to be resident on the pin. Again it is known to provide an ear tag wherein one component having a pin is formed of a more rigid material and the other component made of resilient material. In attaching the ear tag to the animal's ear, an applicator of pliers form is employed with each component attached to a flat jaw of the applicator. Upon closing the applicator the pin pierces the animal's ear and then is forced through a hole in the other component to complete installation after the applicator is opened and removed.

It is further known to provide an applicator in the form of pliers wherein male and female components of an ear tag are each retained in position in a respective jaw of the pliers by retaining clips secured by a spring around a pin attached to the pliers. Such a pliers was designed essentially to install a rigid type tag or a tag having a rigid tab to the animal's ear.

In one instance the present invention is concerned with an animal ear tag, main components of which are formed of a suitable resilient plastics material.

In another instance the invention is concerned with an applicator for applying a tag to an animal's ear, the applicator having such a construction that a resilient tag may be installed to the ear.

Accordingly in one aspect the invention consists of an animal ear tag comprising two components formed of a plastics or other resilient material, a first component having a hollow stem with a flanged end which has a spike of hard plastics or other rigid material formed with a hole for the reception of a guide pin of a reusable back plate, and the second component having a boss with a hole for fitting over such end whereby with each component detachably mounted on a jaw of a pliers-like applicator and the pin of the backplate inserted through the hollow stem of the first component and into the hole of the rigid spike, on a closing of the jaws of the applicator, the spike and stem of the first component is forced through the ear of an animal, and through the hole in the second component, and on an opening of the jaws of the applicator, the rigid pin and its backplate is left within the hollow stem of the first component, and the second component retained on the hollow stem and the spike on the end of the first component, the reusable backing plate with the pin being now withdrawn from the applied tag.

In another aspect the invention consists of an applicator for applying a tag according to the previous aspect to an animal's ear, the applicator being of a pliers nature and having a head including two jaws each having a planar surface one facing the other, a first one of such jaws having a hole adapted for receiving a back stud of the backplate for the first component of the tag, the second one of the jaws having a large hole aligning with the hole of the first jaw in a closing of the jaws and providing a recess for the boss of the second component of the tag when located on this second jaw, a spring-loaded clip mounted on each jaw for retaining the respective tag component to the jaw and the backplate on the first jaw, each clip arranged to allow the tag component to be freed from the clip and the pliers when the tag has been attached to animal's ear.

In further describing the invention reference will be made hereinafter to the accompanying drawing, in which:

FIG. 1 is a sectional side view taken through the tag installed in an animal's ear, FIG. 2 is a side view of the backplate and FIG. 3 is a side view of the head portion of the applicator, with its opened jaws and the tag components shown in cross-section.

In further describing the tag aspect of the invention as a preferred embodiment, each component is of tab-like nature, that is with a main flat thin disc or panel surrounding or depending from the axis of the hollow stem of the first component or the axis of the hole in the second component. Each component is formed of a resilient elastomeric plastics material, such as polyurethane or the like.

The first component 10 has its hollow stem 11 upstanding from one surface of and is moulded integral with the disc or tab 12 of the component. This stem 11 is of tubular formation with a bore of constant diameter extending through it.

The outer end of this hollow stem 11 is of an enlarged nature providing the flanged end 13 having an inner shoulder 14 with the external surface of the rest of the stem 11 and an inside groove 15. The enlarged end 13 is moulded around the hard plastics spike 16 which has a flange 17 fitting into the groove 15 for the spike to become an integral part of the component 10.

The second component 18 is formed with the boss 19 through which the hole 20 is formed. This hole 20 includes a seat 21 of a size larger than the cross-sectional area of the rest of the hole. This hole 20 and its seat 21 extend on an axis perpendicular to the vertical plane of the tab 22 of the second component 18.

The hard plastics spike 16 is so designed that it and the flange end 13 of the first component 10 are encased in the boss 19 of the second component 18. The hard plastics spike 16 is generally of conical formation with its hole 23, which can be blind or straight through the spike providing an outer cutting edge.

The backplate 24 is formed of steel and acts as a base or platform for the first component 10 has a tab 25 similar to that of the first component of the tag. The guide pin 26 preferably of steel is upstanding from the surface of the backplate whilst the stepped stud 27 is upstanding from its other surface. The pin 26 and the back-stud 27 are of a single length passed through the plate 24. The outer end 28 of the guide pin 26 is reduced in diameter to fit through the hole 23 of the spike 16. The length of the guide pin 26 and 28 is such as to extend through the hollow stem 11 of the first component and the hole 23 of the spike 16.

In further describing the applicator aspect of the invention as a preferred embodiment, the pliers can be adapted in any suitable known way for operation in the manner of an overcenter spring arrangement whereby the jaws adopt stable closed and open positions. Such pliers can be described as of the vice-grip type.

The pliers 30 has jaws 31, 32 with mutually-opposed, planar gripping surfaces 33, 34, which in the closed disposition remain parallel to each other. Each planar surface 33 or 34 is fixed and an integral part of its jaw 31 or 32.

The first jaw 31 has its hole 35 positioned centrally and located towards the outer end edge of the jaw, whilst the large hole 36 in the second jaw 32 is for receiving the boss 19 of the second and female component 18 of the tag. So that in the process of applying the tag to the animal's ear by closure of the pliers, the hard plastics spike 16 and the enlarged end 13 of the tubular stem 11 of the tag's first component 10 passes through the hole 20 in the boss 19 of the second component 18 of the tag.

The first component 10 and the hard plastics spike 16 of the tag are of course retained in position by being mounted on the rigid pin 26 and 28 of the backplate 24 in alignment for the component with the stud 27 of such plate 24 located in the hole 35 of the first jaw 31, and retained by the respective spring clip 37 pivoted to the first jaw 31. The second component 18 is retained in position by the spring-loaded clip 38 pivoted to the second jaw 32 of the pliers. Each clip 37 or 38 is of plate nature and has an open slot extending in from its outer end through which the tubular stem 11 of the first component 10 will pass. Each clip 37 or 38 is provided with upstanding side lugs which extend toward the back of the respective jaw, so that they mutually act as a stop.

The clips 37 and 38 are spring-loaded by means of a spring 39 having free ends, each end adapted to engage the clip 37 or 38 of the particular jaw 31 or 32. The spring 39 is preferably a torsion one with a central eye 40 thereof mounted on a bolt 41, pin or screw passing through the head portion of the first jaw 31. One free end or leg of the spring 39 passes down onto the respective clip well beyond its hinging end and towards its open outer end.

The method of loading the applicator with the tag's components 18, 10 including the hard spike 16 is by sliding over the pin 26/28 of the backplate 24 mounting the hollowed stem 11 of the first component 10 and its hard spike 16 down and locating the stem 27 of the backplate 24 into the hole 35 of the first jaw 31 and under its spring-loaded clip 37. It is of course essential that the separate parts be in proper alignment when being applied. The tag's second component 18 is fitted under the retaining clip 38 of the second jaw 32 and the boss 19 located in the recess 36 of such jaw.

During a strong and positive closing of the jaws 31 and 32 of the pliers, the hard spike 16 is punched through the ear A of the animal and this in turn carries the resilient hollowed stem 11 with its enlarged and flanged end 13: where the stem enters the hard plastics spike 16 so forming a shoulder which is an additional force other than the end of the steel pin 26–28 driving against the blind hole through the animal's ear A, and this flange carries through the hole in the boss 19 of the second component 18 and engages and locks into the undercut seat 21 of such hole. This stops the flexible coupling dis-engaging or swivelling on the pin.

By the method of passing the rigid pin 26 of the backing plate 24, through the hollow stem 11 the end of the pin contacts the reduced end in the hard plastics spike 16. This forms a continuous line of stable material with sufficient strength to allow the first component's stem 11 to be passed through the ear A of the animal. On completion of the application, the steel pin 26–28 of the backing plate 24 is still left within the tubular stem 11 of the first component 10; the plate and pin are then withdrawn from the tag which now remains as a resilient tag at the front and rear of the ear.

It is therefore possible for this form of resilient coupling through the animal's ear to be designed for tags of different size of numbering or marking. It will of course be appreciated that whilst a tag and applicator of single pin coupling has been described above, each is open to modification so as to adapted for a twin or multiple pin tag. This latter dual use of two or more pins precluding the tag swivelling.

What is claimed is:

1. An animal ear tag comprising: a first component formed of resilient material having a hollow stem with a flanged outer end; a hollowed spike of hard material fitted on the flanged end of the hollow stem; and a second component formed of a resilient material having a boss with a hole of smaller cross-sectional size than the largest cross-sectional size of the hollowed spike, the second component being positionable on the stem adjacent the hollowed spike, the hollow in said stem and said spike being adapted to receive a support rod for positioning said stem within said hole in said boss during installation of said tag.

2. An animal ear tag as claimed in claim 1 wherein each component is of tab-like configuration, each component having a flat thin panel, the panel of the first component extending from the hollow stem, and the panel of the second component extending from the boss.

3. An animal ear tag as claimed in claim 2 wherein the hollow stem of the first component is upstanding from one surface of and is moulded with the panel of the component, the stem having a bore of constant diameter extending through it, and outer end of the stem being enlarged to provide the flanged end with an inner shoulder extending from the external surface of the stem.

4. An animal ear tag as claimed in claim 3 wherein the enlarged end is moulded around the hollowed spike to become an integral part thereof.

5. An animal ear tag as claimed in claim 4 including a seat in the hole in the boss of the second component, the flanged end of the hollow stem with the spike fitted thereon being supported upon the seat within the hole.

6. An animal ear tag as claimed in claim 5 wherein the hollowed spike is of a conical formation with its hole passing through the apex providing a cutting edge about the hole.

7. An animal ear tag as claimed in claim 1 wherein each component is formed of a resilient elastomeric plastics material.

8. The animal ear tag as claimed in claim 7 wherein said plastic material is polyurethane.

9. An animal ear tag as claimed in claim 1 wherein: the first component has a further hollow stem with a flanged end and a fitted hollowed spike, and the second component has a further boss with a hole for fitting on the flanged end of the first component.

* * * * *